(12) United States Patent
Alimpich et al.

(10) Patent No.: US 6,965,390 B2
(45) Date of Patent: Nov. 15, 2005

(54) METHOD, SYSTEM, AND PROGRAM FOR SELECTING DEVICES TO USE TO EXECUTE SELECTED TASKS IN A GRAPHICAL USER INTERFACE

(75) Inventors: Claudia Alimpich, Boulder, CO (US); Benjamin Nelson Jeffcoat, Boulder, CO (US); Deborah Elizabeth Neuhard, Longmont, CO (US); Luana Linda Vigil, Longmont, CO (US); James Philip John Wittig, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 09/865,043

(22) Filed: May 24, 2001

(65) Prior Publication Data
US 2001/0022592 A1 Sep. 20, 2001

Related U.S. Application Data

(63) Continuation of application No. 09/052,858, filed on Mar. 31, 1998, now Pat. No. 6,281,896.

(51) Int. Cl.[7] ................................................ G09B 5/00
(52) U.S. Cl. ........................................ 345/781; 345/765
(58) Field of Search ................................ 715/763, 764, 715/765; 345/762, 765, 744, 764, 781, 804, 835, 701

(56) References Cited

U.S. PATENT DOCUMENTS 5,467,434 A * 11/1995 Hower, Jr. et al. ......... 345/804
5,714,971 A * 2/1998 Shalit et al. ................ 345/804
6,043,816 A * 3/2000 Williams et al. ........... 345/781

* cited by examiner

Primary Examiner—Cao (Kevin) Nguyen
(74) Attorney, Agent, or Firm—David W. Victor; Konrad Raynes & Victor LLP (57) ABSTRACT

A data processing controlled display system for the interactive display and control of a hierarchical trees of elements or objects in which multiple tree views are presented to the user. The objects in the views are selectable to display detail views of the objects, particularly attributes of the child objects of the selected parent object. The multiple tree views may be of different portions of the same tree or of different trees. The tree views are thus available for side by side comparison and detailed study, after which the system provides the capability to transfer objects from tree view to tree view, e.g. by drag and drop means.

27 Claims, 9 Drawing Sheets

METHOD, SYSTEM, AND PROGRAM FOR SELECTING DEVICES TO USE TO EXECUTE SELECTED TASKS IN A GRAPHICAL USER INTERFACE

This application is a continuation of application Ser. No. 09/052,858 filed Mar. 31, 1998, now U.S. Pat. No. 6,281,896.

CROSS-REFERENCE TO RELATED COPENDING PATENT APPLICATIONS

The following patent applications which are assigned to the assignee of the present invention cover subject matter related to the subject matter of the present invention: "Data Processor Controlled Display System With a Plurality of Selectable Basic Function Interfaces for the Control of Varying Types of Customer Requirements and With Additional Customized Functions", Ser. No. 09/053,210; "Data Processor Controlled Display System With a Plurality of Switchable Customized Basic Function Interfaces for the Control of Varying Types of Operations", Ser. No. 09/053,214; "Data Processor Controlled Display System for the Control of Operations With Control Properties Which are Selectably Constant or Variable", Ser. No. 09/053,207; "Data Processor Controlled Display Interface With Tree Hierarchy of Elements View Expandable into Multiple Detailed Views", Ser. No. 09/053,209; "Data Processor Controlled Display With a Tree of Items With Modification of Child Item Properties Designated at Parent Level Without Modification of Parent Item Properties", Ser. No. 09/053,211; and "Data Processor Controlled Display System With a Tree Hierarchy of Elements View Having Virtual Nodes", Ser. No. 09/053,213; all are assigned to International Business Machines Corporation by Claudia Alimpich et al. and all are filed concurrently herewith.

TECHNICAL FIELD

The present invention relates to user-friendly interactive computer supported display technology and particularly to such user interactive systems and programs which have user interactive interfaces with tree hierarchies of objects.

BACKGROUND OF THE INVENTION

The computer and computer related industries have benefitted from a rapidly increasing availability of data processing functions. Along with this benefit comes the problem of how to present the great number and variety of available functions to the interactive operator or user in display interfaces which are relatively easy to use. In recent years, the hierarchal tree has been a widely used expedient for helping the user to keep track of and organize the operative and available functions. In typical tree structures such as those in Microsoft Windows 95(™) and IBM Lotus(™) systems, there is presented on the display screen a variety of operating and available functions and resources in tree hierarchies with classes and subclasses of functions and resources displayed as objects or elements at nodes in a descending and widening order based upon some kind of derivation from the next higher class or subclass. In conventional tree displays, it is customary to show the tree on one region of the screen and to permit the user to interactively select any object on the screen for a detail view showing attributes or properties of the selected object or of child objects of the selected object. Such child objects may be said to be derived or comprehended by the selected or parent object. This detail view is customarily displayed in a second region of the screen which is separate from the tree view. These conventional interfaces operate effectively with relatively simple tree structures, particularly when the tree is small enough to be displayed within the portion of the screen allocated for the tree view. However, with the great increase of functions available in computers, it is now often the situation that the displayed trees will be greatly expanded and have many nodes and branches. With these more complex trees, the entire tree may not be viewed in the tree view region of a screen and extensive scrolling has to be done in order to view all portions of the tree. This complicates user interaction, particularly in situations where the user needs to view and compare objects or properties of objects which are in portions of the tree remote from each other. Also, when the user needs to move objects from one part of a tree to another part of the tree, the inability to view source and destination points of the potential object transfer simultaneously on the screen complicates the user interaction.

It should also be noted that the tree hierarchical structure is one of the primary organizational expedients in the object oriented programming processes which have become more prevalent over the past decade. In object oriented programming systems there are many implementations in which there are hierarchies of child objects in subclasses of parent object classes wherein the child objects inherit at least some attributes of the parent objects. The present invention may be advantageously used with such tree hierarchies. Like the trees described above, it is not unusual in object oriented programming to have very elaborate and extensive hierarchal relationships displayed in tree views.

Before proceeding with the description of the invention, it is important that we clarify the terminology used in describing the present invention with respect to terminology used in the art. The typical tree structure used in interactive displays has a plurality of levels of nodes at which elements are displayed. Such elements may be in text or icon form. The elements each represent a function or resource of the system or program which is to be interactively accessed through the displayed tree. It is customary to refer to these displayed elements as objects so as to conveniently use the terms child objects or parent objects in describing various hierarchical relationships between objects. It should be understood that in object oriented programming the term object is, of course, extensively used to represent the basic program units. Thus, it may sometimes be the case that the object in a displayed tree does represent an object in an object oriented program. However, since trees of displayed objects are used to interface with many systems not involving object oriented programming, the use of the word object is not intended to limit the description or claim to object oriented applications. The terms object and elements as used in the claims should be considered as substantially equivalent.

SUMMARY OF THE INVENTION

The present invention provides a solution to the above problems by providing the user with the ability to simultaneously show two different tree views. The invention relates to a data processor controlled display system providing an ease of use interface based upon a tree view of selectable elements arranged in a hierarchy on a display screen. It involves a first tree view of a hierarchy of selectable elements or objects in one region of a display interface screen and a second tree view of a hierarchy of selectable elements or objects in a second region of a display interface screen in combination with means responsive to the selection of an object for displaying additional data relative to said selected object in another region of said screen. This additional data is provided in what may be referred to as a detail view of the selected object. This detail view may set forth attributes of the selected object or of the child objects of the selected object. In this manner, the user may get whatever details he requires with respect to objects in either tree view, after which he may redistribute or allocate his resources by transferring objects within each tree view or between tree views. Such transfer may be done by drag and drop means. The two different tree views may be of respective portions of the same hierarchal tree or the views may be of different trees.

As will be seen hereinafter in greater detail, the present invention may be advantageously used in the control of production operations such as high throughput printing operations.

DETAILED DESCRIPTION OF THE PREFERRED EMBODIMENT

Figure 1:
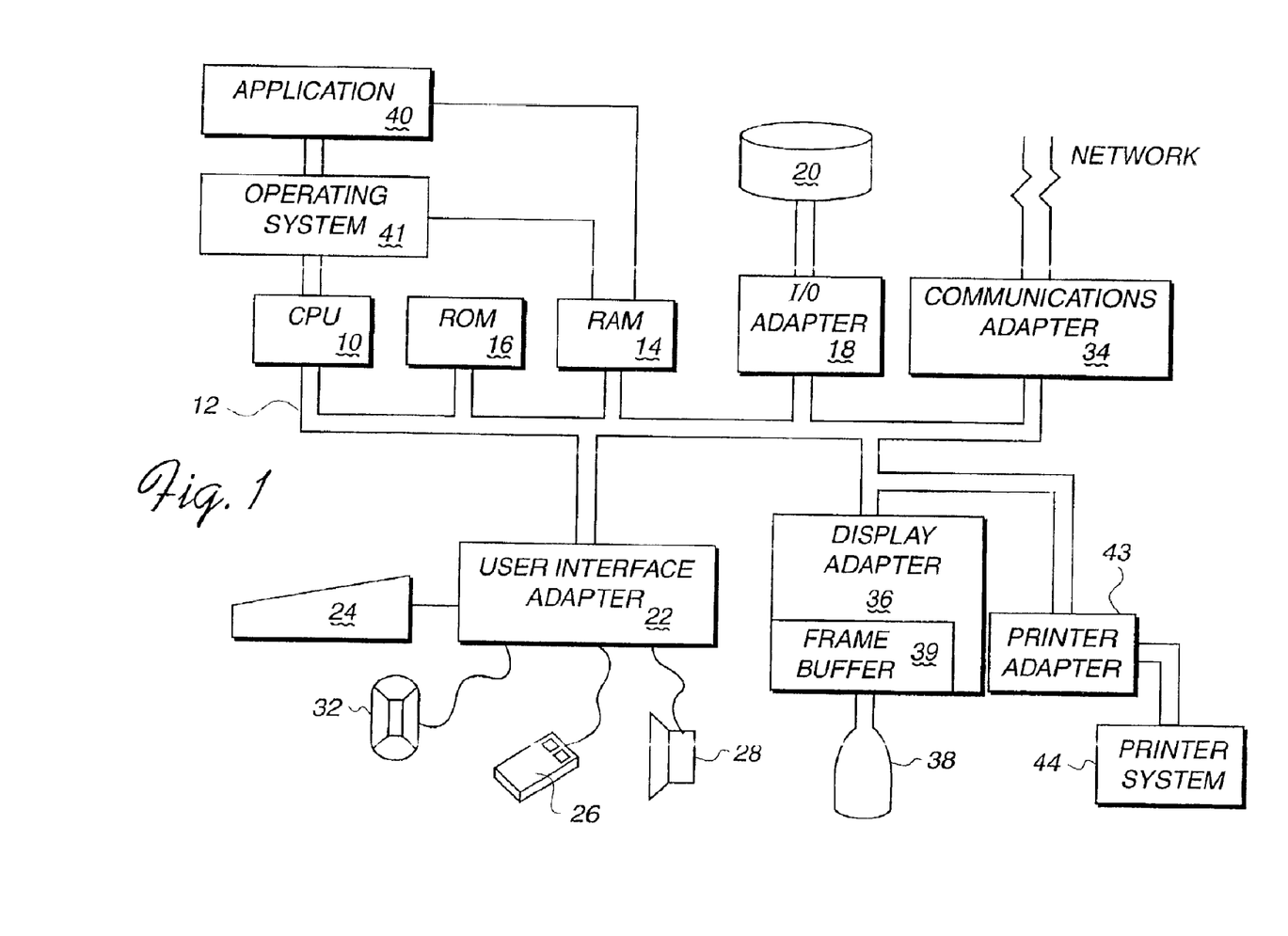
FIG. 1 is a block diagram of an interactive data processor controlled display system including a central processing unit which is capable of implementing the program of the present invention for presenting object tree views and the detail views.

Referring to FIG. 1, a typical data processing system is shown which may function as the computer controlled display terminal used in implementing the tree view and detail view functions of the present invention. A central processing unit (CPU), such as one of the PC microprocessors available from International Business Machines Corporation, is provided and interconnected to various other components by system bus 12. An operating system 41 runs on CPU 10, provides control and is used to coordinate the function of the various components of FIG. 1. Operating system 41 may be one of the commercially available operating systems such as DOS or the OS/2 operating system available from International Business Machines Corporation (OS/2 is a trademark of International Business Machines Corporation); Microsoft Windows 95(™) or Windows NT(™), as well as Unix and AIX operating systems. A programming application for displaying multiple hierarchical tree views and for presenting detail views in accordance with the present invention, application 40 to be subsequently described in detail, runs in conjunction with operating system 41 and provides output calls to the operating system 41 which implements the various functions to be performed by the application 40.

A read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. It should be noted that software components, including the operating system 41 and the application 40, are loaded into RAM 14 which is the computer system's main memory. I/O adapter 18 may be a small computer system adapter that communicates with the disk storage device 20, i.e. a hard drive. Communications adapter 34 interconnects bus 12 with an outside network enabling the data processing system to communicate with other such systems of which objects may also be displayed in the object tree interfaces of the present invention. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receive output information from the system via speaker 28 and display 38. In the illustrative embodiment, which will be subsequently described, the multiple hierarchical trees of objects and the subsequent separated details views of different objects will be shown with respect to the control of high throughput printers such as electrophotographic or laser printers. A local printer system 44 may be accessed and controlled via printer adapter 43 while, as previously mentioned, networked printers may communicate via communications adapter 34.

There will now be described a simple illustration of the present invention with respect to the display screens of FIGS. 2 through 7. When the screen images are described, it will be understood that these may be rendered by storing an image and text creation programs, such as those in any conventional window operating system in the RAM 14 of the system of FIG. 1. The operating system is diagrammatically shown in FIG. 1 as operating system 41. The display screens of FIGS. 2 through 7 are presented to the viewer on display monitor 38 of FIG. 1. In accordance with conventional techniques, the user may control the screen interactively through a conventional I/O device such as mouse 26 of FIG. 1 which operates through user interface 22 to call upon programs in RAM 14 cooperating with the operating system 41 to create the images in frame buffer 39 of display adapter 36 to control the display on monitor 38.

Figure 2:
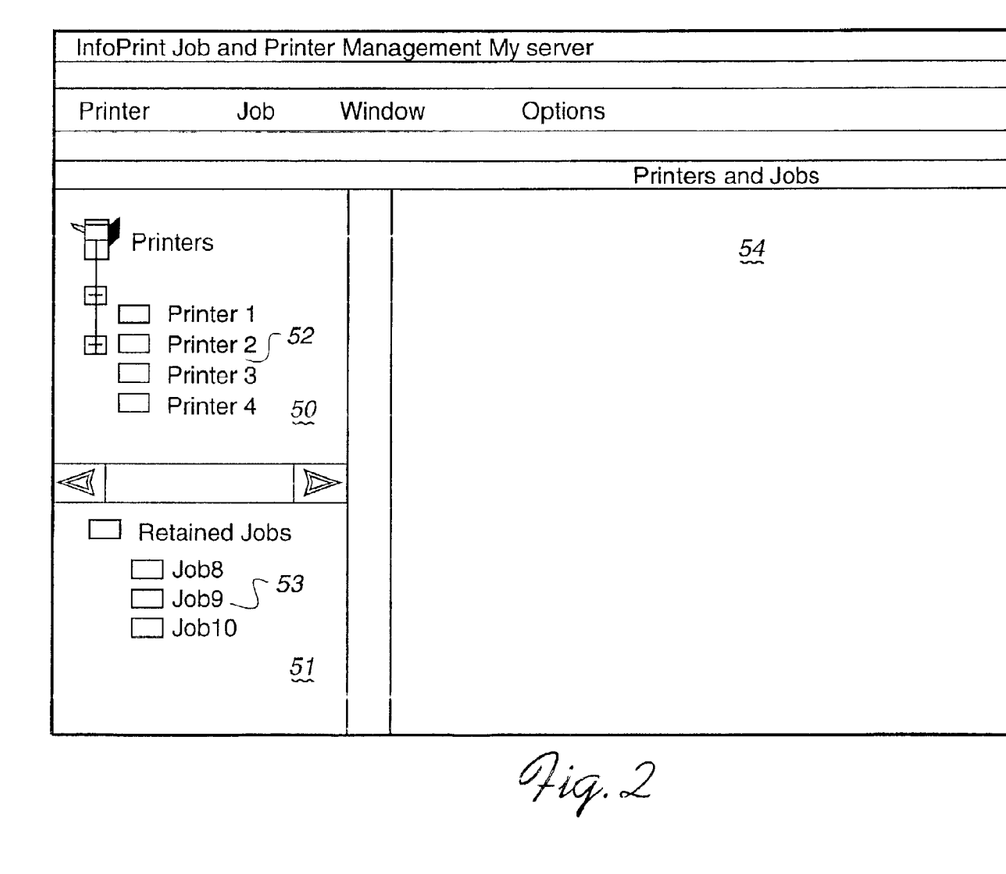
FIG. 2 is a diagrammatic view of a display screen on which two separate hierarchical object tree views are shown prior to any user selection.
Figure 3:
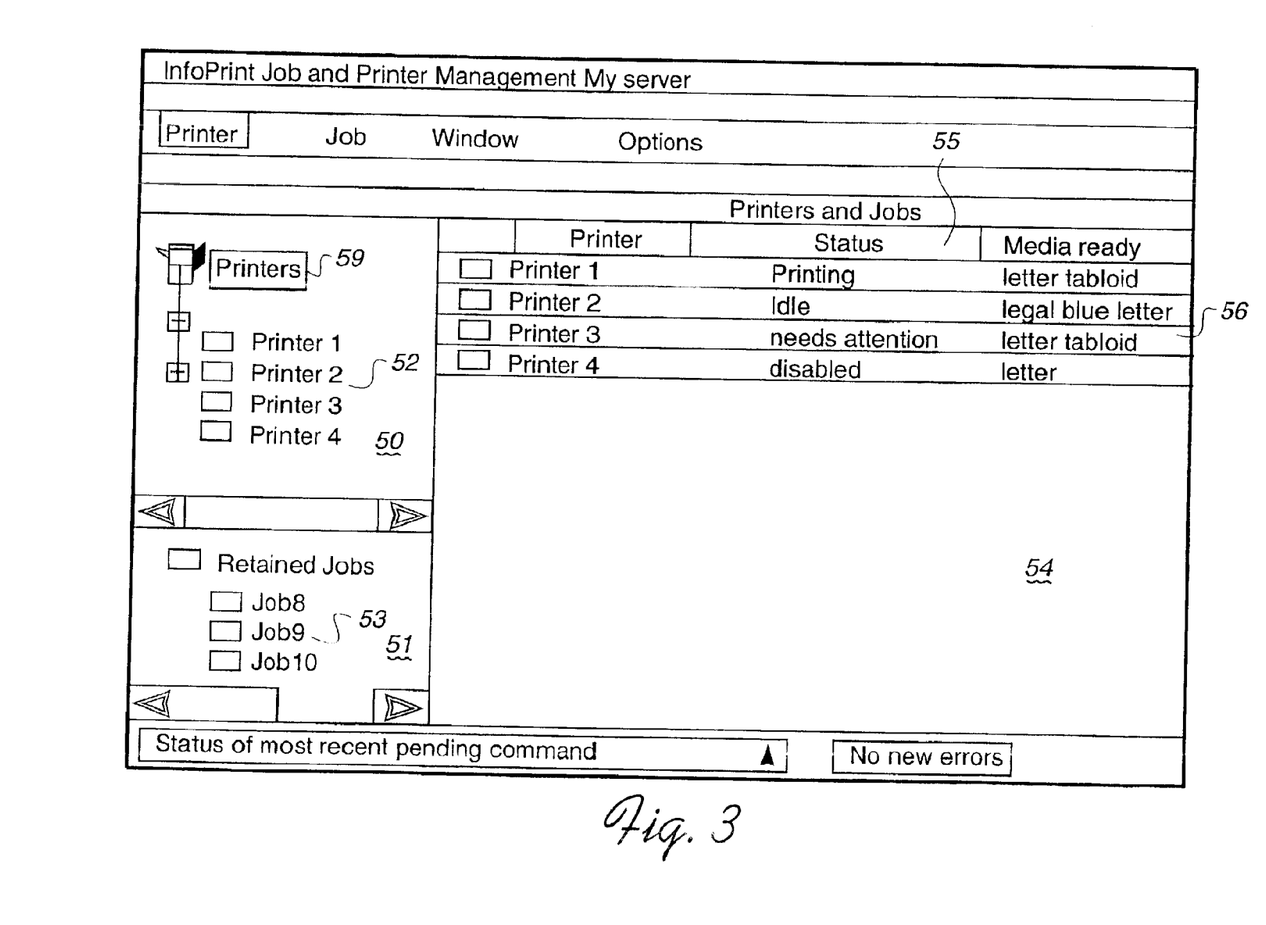
FIG. 3 is the view of the display screen of FIG. 2 showing the details view resulting from the selection of an object from the first tree view.
Figure 4:
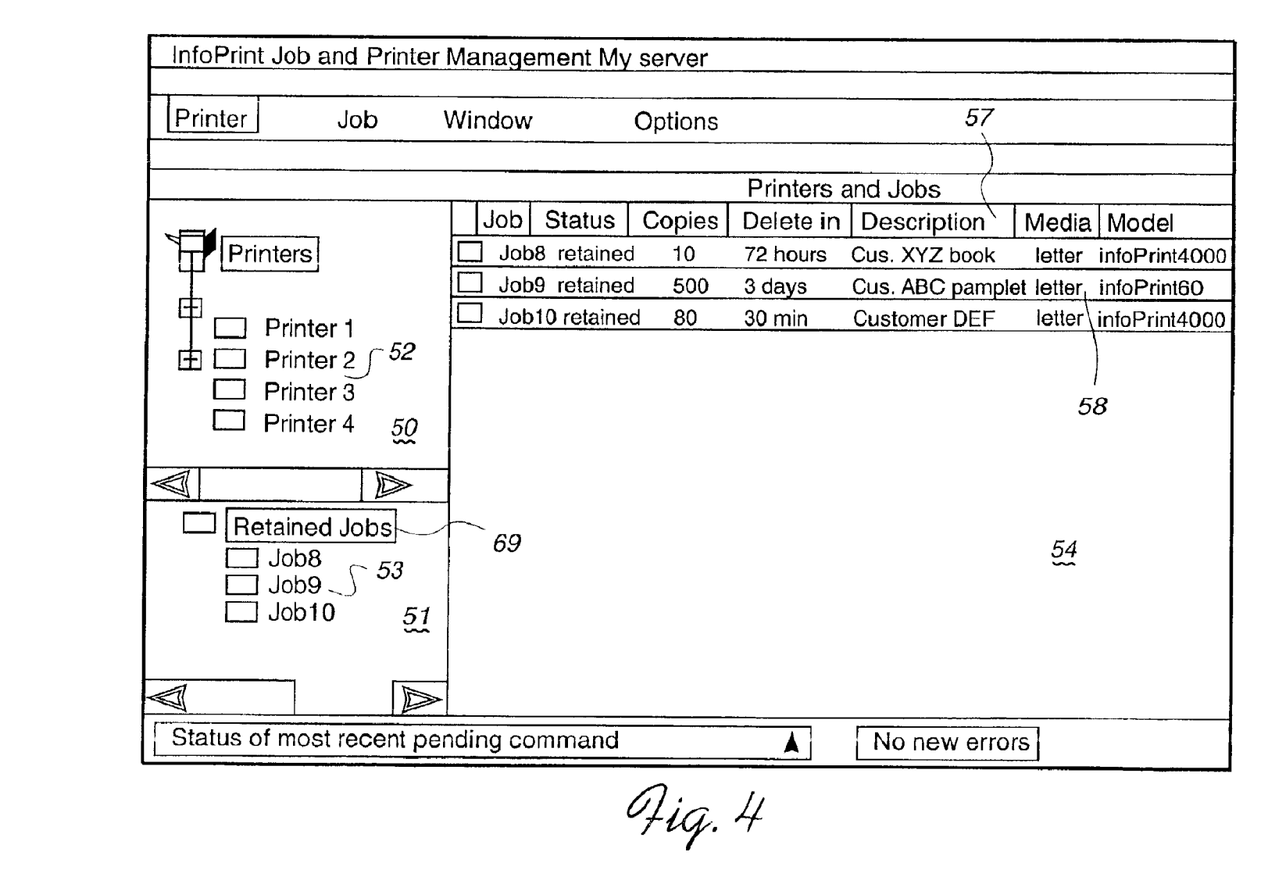
FIG. 4 is the view of the display screen of FIG. 2 showing the details view resulting from the selection of an object from the second tree view.
Figure 5:
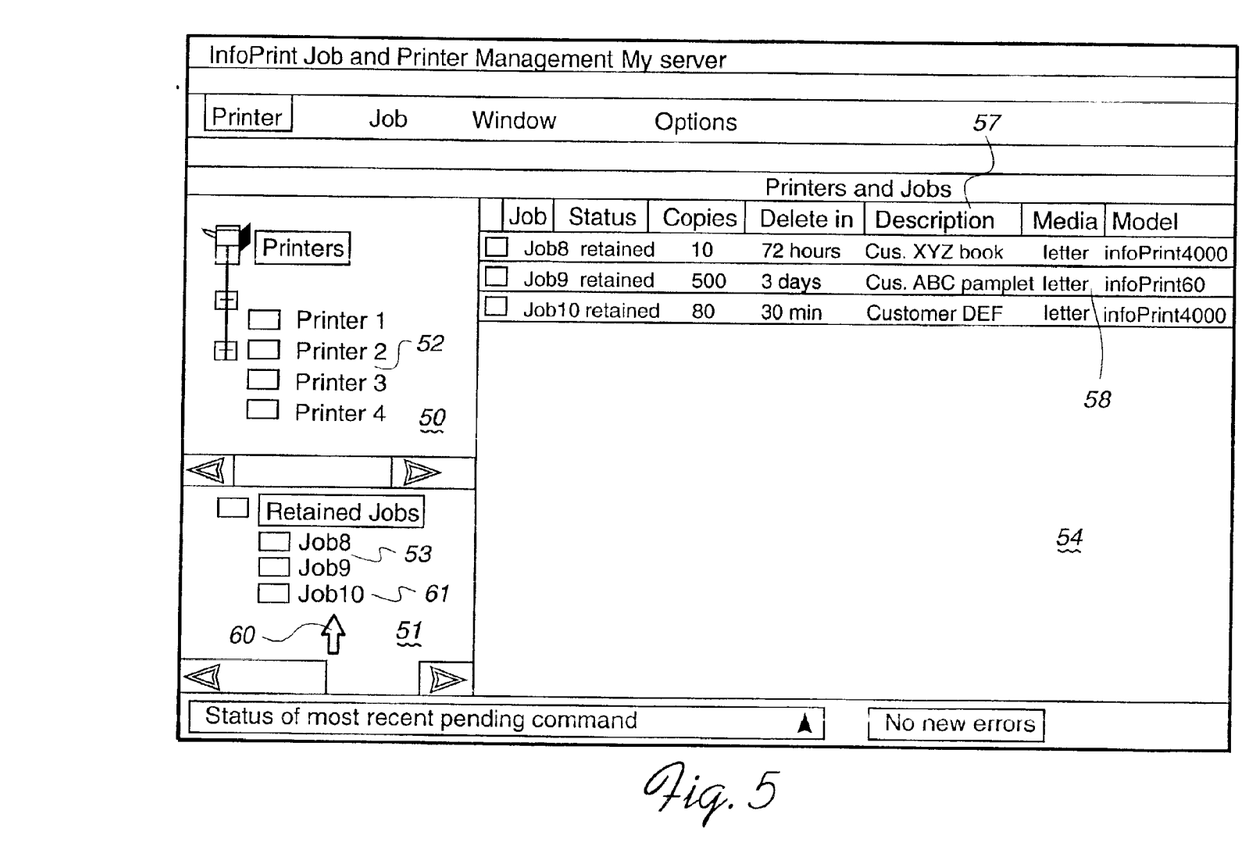
FIG. 5 is the display screen of FIG. 4 after the selection of an object in the second tree view to be transferred and thus allocated to an object in the first tree view.

The display screen of FIG. 2 shows a first portion of a hierarchical tree 52 in region 50 which represents a hierarchy of available printers involved in the printer production operations being controlled. Also shown is a second tree portion 53 in screen region 51 which is a list of retained jobs awaiting assignment to printers or other disposal. It should be noted that the objects in tree portions 52 and 53 may be parts of the same overall tree. With such an overall tree where the user wishes to do a side by side comparison of a plurality of resources, needs and functions associated with nodes in different parts of the tree, he would scroll to his desired first portion of the tree in region 50 and then scroll to his desired second portion 53 in the overall tree in the other window or region 51. While we are showing only two regions, 50 and 51, for convenience of illustration, it is understood that any reasonable plurality could be set up to handle a corresponding plurality of tree portions. Also, regions 50 and 51 could be expanded or curtailed in size dependent upon the size of the selected tree portions. This changing of the sizes of regions 50 and 51 could be done by using any of the conventional window size changing techniques provided by any of the above-mentioned operating systems. Also, under appropriate conditions, tree portions 52 and 53 could be from different trees. In the present example the comparison of tree portions 52 and 53 is being carried out so that the user may decide which of the retained jobs in tree 53 may be assigned to which of the printers in tree 52. In order for the user controlling the printing operation to assign jobs to printers, he may need further information: expanded views giving details of the jobs in tree portion 53 and the printers in tree portion 52. Region 54 in the screen of FIG. 2 is provided for such expanded views. Assume that he first wishes available printer details, as shown in FIG. 3, he selects Printer object 59 which becomes highlighted, and he gets the expanded or detail view 56 of all of Printer1 through Printer4 which may be considered the child objects of Printer object 59. The values of the attributes 55 of the Printer's child objects are set forth. Similarly, if the user now wishes to get an expanded or detail view of the Retained Jobs, he clicks on Retained Jobs object 69, FIG. 4, which becomes highlighted and he gets the expanded or detail view 58 of all of the Jobs8 through Jobs10 which may be considered the child objects of Retained Jobs object 69. The values of the attributes 57 of the job child objects are set forth. Now, after the user has seen the detail views of his resources, he may commence to assign the Jobs8 through Jobs10 to Printer1 through Printer4. He may do this by a "Drag and Drop" screen interaction. In FIG. 5, for example, he points to Job10 with pointer 60, clicks on it and it becomes movable. Then, FIG. 6, through the movement of pointer 60, he drags Job10 along path 62 to deposit Job10 on Printer1 and thus indicate that Job10 is assigned to Printer1. As a result, FIG. 7, the allocation of Job10 has been disposed of and it is no longer in tree view 53 or in details view 58 of jobs. The remaining jobs may be similarly allocated to printers.

Figure 6:
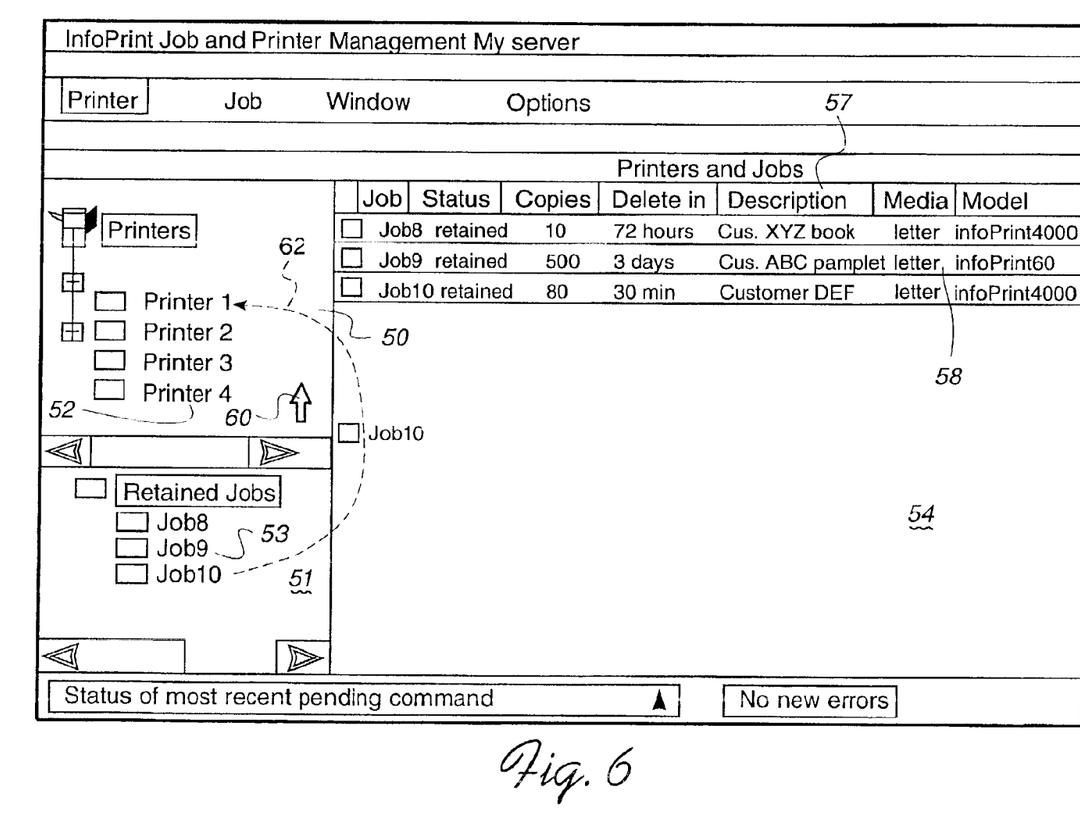
FIG. 6 is the display screen of FIG. 5 showing the movement of the object selected for transfer at an intermediate point in a drag and drop transfer.
Figure 7:
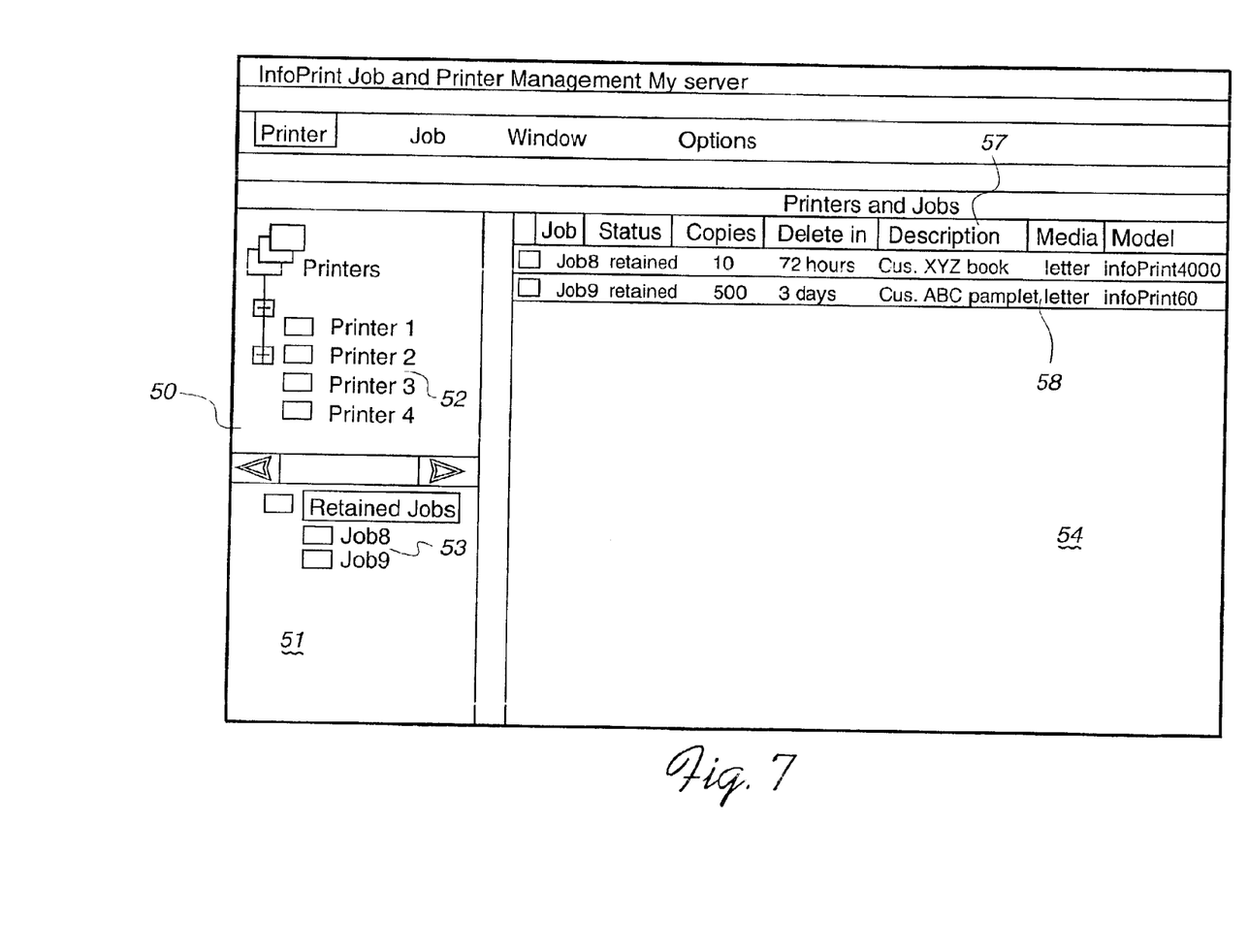
FIG. 7 is the display screen of FIG. 6 upon the completion of the drag and drop transfer.
Figure 8:
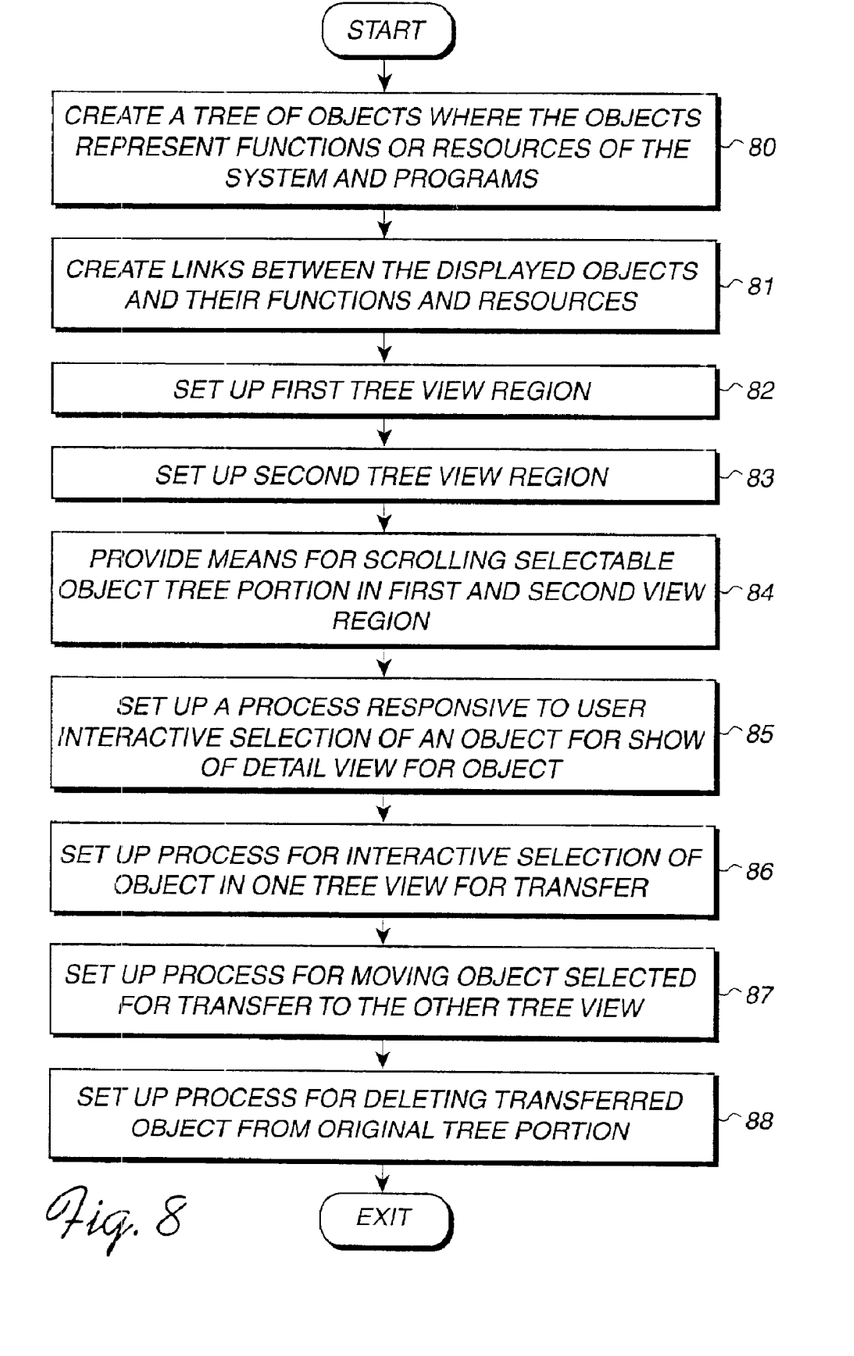
FIG. 8 is a flowchart showing the development of the program of the present invention for displaying two or more tree views and the detail view of the attributes of selected objects from said tree views.

Now with reference to FIG. 8, we will describe a process implemented by a program according to the present invention. The program is continuous and involves the development of the display screen interfaces previously described with respect to FIGS. 2 through 7. In the flowchart of FIG. 8, a basic hierarchical interface is set up, step 80, wherein the objects represent the functions and resources of the systems. In the present example, these would be printer operation control interfaces. Of course, appropriate conventional linkages are set up between representations of functions displayed on a screen whether these representations be text or icons representative of the functions and the functions themselves, step 81. Then, steps 82 and 83, first and second regions are set up, e.g. regions 50 and 51, FIG. 2, within which selected portions of trees may be viewed. In step 84 of FIG. 8, scrolling means are provided to scroll the tree hierarchies within regions 50 and 51 to set the desired tree portions in the two regions e.g., tree portions 52 and 53, FIG. 2. Next, step 85, FIG. 8, a process is set up responsive to the selection of a particular object for detail views for the object. This would, for example, be the detail views 56 of printers, FIG. 3, and the detail views 58 of jobs, FIG. 4. Then, step 86, a process is set up for the selection of an object for transfer e.g., Job10, FIG. 5, for moving the selected object, step 87, out of its tree view and into the other tree view as illustrated in FIG. 6, and then, step 88, upon completion of the transfer, deleting the object from its original tree position as illustrated in FIG. 7. It should be noted in connection with setting up the programming for carrying out steps 86 through 88 that most of the systems mentioned above, such as OS/2 or Windows 95 have drag and drop functions which are readily modifiable to carry out the described transfer between tree portions.

Figure 9:
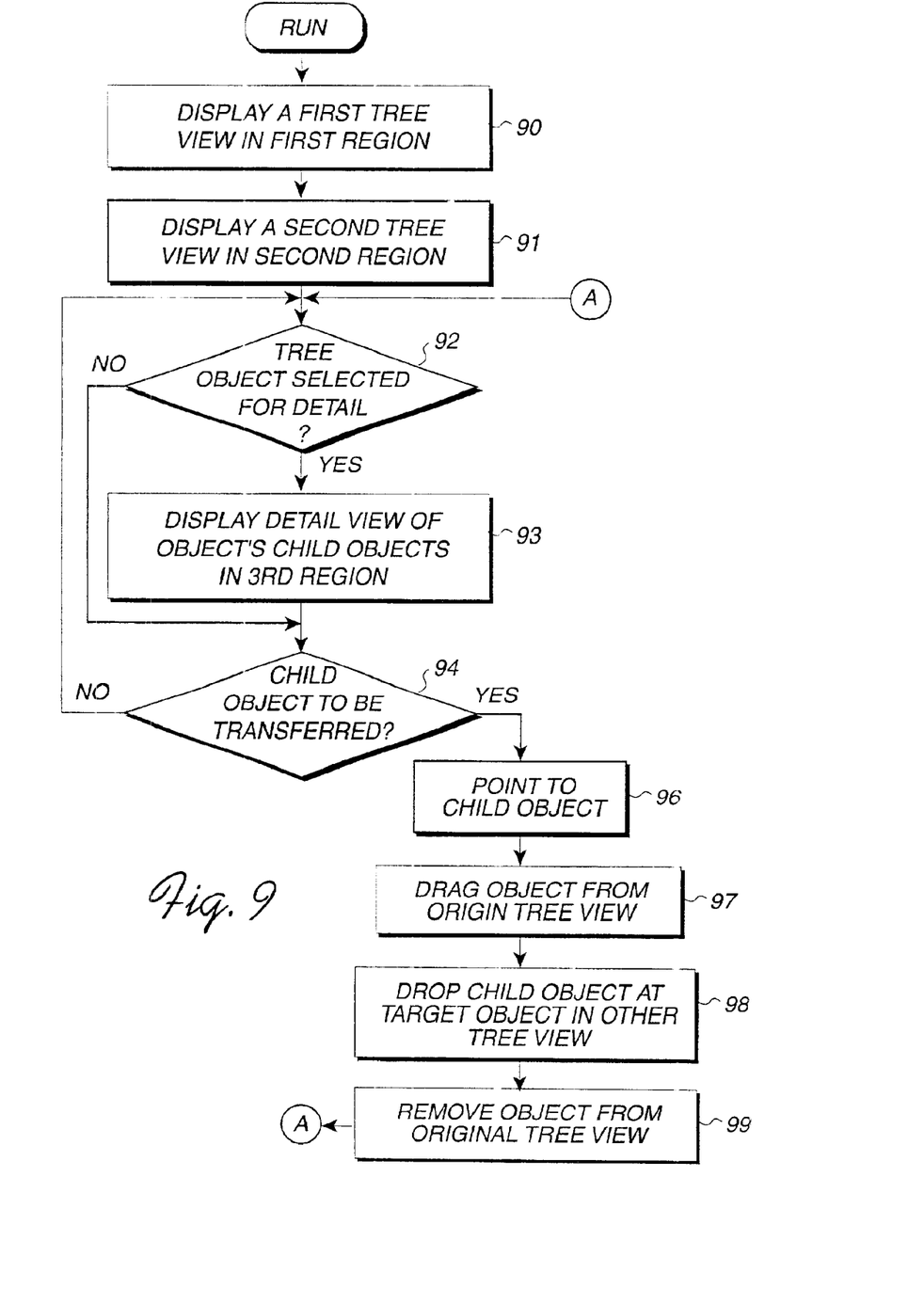
FIG. 9 is a flowchart showing the running of the program described with respect to FIG. 8.

Now that the basic program has been described and illustrated, there will be described with respect to FIG. 9, a flow of a simple operation showing how the program could be run. First, steps 90 and 91, the display of FIG. 2 is set up with trees 52 and 53 respectively in regions 50 and 51. Next, an initial determination is made as to whether an object in the tree has been selected for an expanded view which, in the present example, would be detail view of its child objects, step 92. If No, the flow is routed to decision step 94. If there is a selection of a particular object in either trees 52 or 53, then, step 93, a detail view of the attributes of the child objects of the selected object is shown as in FIGS. 3 and 4. After viewing the detail views, the user would make decisions with respect to transferring objects from one tree view to another. A determination is made, decision step 94, as to whether an object has been selected for transfer. If Yes, then step 96, the object is picked by the pointer, FIG. 5, dragged from the original tree view, step 97, FIG. 6, to the target object in the other tree, step 98. The child object, which was transferred, is then dropped from its original tree, step 99, as in FIG. 7, and the flow is returned to decision step 92 via branch "A". If the decision from step 94 is No child object has been selected for transfer, then the flow is branched back to step 92 to await the user selection of other tree views in accordance with the program of this invention.

While the embodiment described has been for a hierarchical tree used in the control of resources in a printing environment, it has been mentioned hereinabove that the present invention may be advantageously used in object oriented programming systems where hierarchical trees are extensively used. By way of background, with respect to object oriented programming, its techniques involve the definition, creation, use and construction of "objects". These objects, as mentioned above, are not to be confused with display tree objects or elements; they are software entities comprising data elements or attributes and methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods. Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. A significant property of object oriented programming is inheritance, which allows program developers to reuse pre-existing programs. Inheritance allows a software developer to define classes and the objects which are later created from them as related through a class hierarchy. Specifically, classes may be designated as subclasses of other base classes. A subclass inherits and has access to all of the public functions of its base classes as though these functions appeared in the subclass. Alternatively, a subclass can override some or all of its inherited functions or may modify some or all of its inherited functions by defining a new function with the same form. The creation of a new subclass borrowing the functionality of another class allows software developers to easily customize existing code to meet their particular needs.

In order to help object oriented program developers construct programs, particularly when inheritance is involved, object oriented programming systems make use of hierarchical trees in order to help the interactive programmers and users in the understanding of the basic structures of classes and subclasses, as well as parent objects in classes and their child objects in the various types of subclasses inheriting some of their properties from the classes above them in the hierarchy. Object oriented technology trees are at times very elaborate with many branches and trunks in their hierarchy. It is in the organization and reorganization of object oriented program trees that the present invention may be effectively used when it would be desirable to study the relationships of various portions of such programs to each other or to the tree hierarchies of other related programs.

Although certain preferred embodiments have been shown and described, it will be understood that many changes and modifications may be made therein without departing from the scope and intent of the appended claims.

What is claimed is:

1. A method for executing print jobs with printers, comprising:
   displaying a first tree view of a hierarchy of a first set of user selectable elements representing printers in a first pane of a graphical user interface (GUI) window;
   displaying a second tree view of a hierarchy of a second set of user selectable elements representing print jobs capable of being executed by the printers in a second pane of the GUI window; and
   receiving indication of user selection of one of the print jobs displayed in the second pane and one of the printers displayed in the first pane to cause the selected printer to execute the selected print job.

2. The method of claim 1, further comprising:
   receiving indication of user selection of one of the selectable elements displayed in the first pane or the second pane; and
   displaying additional data related to the user selected element in a third pane in the GUI window, wherein the third pane is capable of displaying additional data related to selectable elements the user selected in the first and second panes.

3. The method of claim 2, wherein the additional data displayed in the third pane in response to selection of one selectable element in the first pane representing one printer indicates an operation status of at least one printer.

4. The method of claim 2, wherein the additional data displayed in the third pane in response to user selection of one selectable element in the second pane representing one print job indicates information on the print job.

5. The method of claim 4, further comprising:
   after one print job for which information is displayed has completed executing, displaying the second pane without the selectable element representing the print job that has completed.

6. The method of claim 1, further comprising:
   receiving indication of user selection of one selectable element in the first pane associated with all the user selectable elements representing the printers; and
   displaying additional data in a third pane indicating an operational status of all the printers represented by user selectable elements displayed in the first pane.

7. The method of claim 1, further comprising:
   displaying in a third pane status of print jobs represented by user selectable elements in the second pane.

8. The method of claim 1, further comprising:
   displaying in the third pane media available at each printer represented by the user selectable elements in the first pane.

9. The method of claim 1, wherein receiving indication of user selection of one of the print jobs and one of the printers comprises:
   receiving user indication of dragging one print job represented in the second pane and dropping the dragged print job to one printer represented in the first pane.

10. A system for executing print jobs with printers, comprising:
    means for displaying a first tree view of a hierarchy of a first set of user selectable elements representing printers in a first pane of a graphical user interface (GUI) window;
    means for displaying a second tree view of a hierarchy of a second set of user selectable elements representing print jobs capable of being executed by the printers in a second pane of the GUI window; and
    means for receiving indication of user selection of one of the print jobs displayed in the second pane and one of the printers displayed in the first pane to cause the selected printer to execute the selected print job.

11. The system of claim 10, further comprising:
    means for receiving indication of user selection of one of the selectable elements displayed in the first pane or the second pane; and
    means for displaying additional data related to the user selected element in a third pane in the GUI window, wherein the third pane is capable of displaying additional data related to selectable elements the user selected in the first and second panes.

12. The system of claim 11, wherein the additional data display in the third pane in response to selection of one selectable element in the first pane representing one printer indicates an operation status of at least one printer.

13. The system of claim 11, wherein the additional data displayed in the third pane in response to user selection of one selectable element in the second pane representing one print job indicates information on the print job.

14. The system of claim 13, further comprising:
    means for displaying the second pane without the selectable element representing the print job that has completed after one print job for which information is displayed has completed executing.

15. The system of claim 10, further comprising:
    means for receiving indication of user selection of one selectable element in the first pane associated with all the user selectable elements representing the printers; and means for displaying additional data in a third pane indicating an operational status of all the printers represented by user selectable elements displayed in the first pane.

16. The system of claim 10, further comprising:

displaying in a third pane status of print jobs represented by user selectable elements in the second pane.

17. The system of claim 10, further comprising:

displaying in the third pane media available at each printer represented by the user selectable elements in the first pane.

18. The system of claim 10, wherein receiving indication of user selection of one of the print jobs and one of the printers comprises:

receiving user indication of dragging one print job represented in the second pane and dropping the dragged print job to one printer represented in the first pane.

19. A computer program having code embedded in a computer readable medium for executing print jobs with printers using a graphical user interface (GUI) window displayed on a computer display monitor, comprising:

displaying a first tree view of a hierarchy of a first set of user selectable elements representing printers in a first pane of a graphical user interface (GUI) window;

displaying a second tree view of a hierarchy of a second set of user selectable elements representing print jobs capable of being executed by the printers in a second pane of the GUI window; and receiving indication of user selection of one of the print jobs displayed in the second pane and one of the printers displayed in the first pane to cause the selected printer to execute the selected print job.

20. The computer program of claim 19, further comprising:

receiving indication of user selection of one of the selectable elements displayed in the first pane or the second pane; and displaying additional data related to the user selected element in a third pane in the GUI window, wherein the third pane is capable of displaying additional data related to selectable elements the user selected in the first and second panes.

21. The computer program of claim 20, wherein the additional data displayed in the third pane in response to selection of one selectable element in the first pane representing one printer indicates an operation status of at least one printer.

22. The computer program of claim 20, wherein the additional data displayed in the third pane in response to user selection of one selectable element in the second pane representing one print job indicates information on the print job.

23. The computer program of claim 22, further comprising:

after one print job for which information is displayed has completed executing, displaying the second pane without the selectable element representing the print job that has completed.

24. The computer program of claim 19, further comprising:

receiving indication of user selection of one selectable element in the first pane associated with all the user selectable elements representing the printers; and displaying additional data in a third pane indicating an operational status of all the printers represented by user selectable elements displayed in the first pane.

25. The computer program of claim 19, further comprising:

displaying in a third pane status of print jobs represented by user selectable elements in the second pane.

26. The computer program of claim 19, further comprising:

displaying in the third pane media available at each printer represented by the user selectable elements in the first pane.

27. The computer program of claim 19, wherein receiving indication of user selection of one of the print jobs and one of the printers comprises:

receiving user indication of dragging one print job represented in the second pane and dropping the dragged print job to one printer represented in the first pane.

* * * * *

UNITED STATES PATENT AND TRADEMARK OFFICE
CERTIFICATE OF CORRECTION

| | | |
|---|---|---|
| PATENT NO. | : 6,965,390 B2 | Page 1 of 1 |
| APPLICATION NO. | : 09/865043 | |
| DATED | : November 15, 2005 | |
| INVENTOR(S) | : Claudia C. Alimpich et al. | |

It is certified that error appears in the above-identified patent and that said Letters Patent is hereby corrected as shown below:

Column 8, line 50, delete "display" and insert -- displayed -- .

Signed and Sealed this

Tenth Day of April, 2007

JON W. DUDAS
*Director of the United States Patent and Trademark Office*